US012523886B2

United States Patent
Gacoin et al.

(10) Patent No.: US 12,523,886 B2
(45) Date of Patent: Jan. 13, 2026

(54) LENS ELEMENT

(71) Applicant: Essilor International, Charenton-le-pont (FR)

(72) Inventors: Eric Gacoin, Charenton-le-pont (FR); Bruno Fermigier, Charenton-le-pont (FR); Matthieu Guillot, Charenton-le-pont (FR)

(73) Assignee: Essilor International, Charenton-le-pont (FR)

( * ) Notice: Subject to any disclaimer, the term of this patent is extended or adjusted under 35 U.S.C. 154(b) by 598 days.

(21) Appl. No.: 17/907,445

(22) PCT Filed: Mar. 31, 2021

(86) PCT No.: PCT/EP2021/058488
§ 371 (c)(1),
(2) Date: Sep. 27, 2022

(87) PCT Pub. No.: WO2021/198362
PCT Pub. Date: Oct. 7, 2021

(65) Prior Publication Data
US 2023/0128895 A1    Apr. 27, 2023

(30) Foreign Application Priority Data
Mar. 31, 2020  (EP) .................... 20315087

(51) Int. Cl.
*G02C 7/02*     (2006.01)
*B29D 11/00*    (2006.01)

(52) U.S. Cl.
CPC .......... *G02C 7/022* (2013.01); *B29D 11/0048* (2013.01); *G02C 2202/24* (2013.01)

(58) Field of Classification Search
USPC .................................................... 351/159.79
See application file for complete search history.

(56) References Cited

U.S. PATENT DOCUMENTS 6,419,860 B1 *   7/2002   Magne ............. B29D 11/00413
                                                       249/161
8,556,416 B2 *  10/2013   Lawu .................... G02B 5/1895
                                                       623/6.31
(Continued)

FOREIGN PATENT DOCUMENTS

| AU | 2019203682 A1 | 12/2019 |
| EP | 3 514 613 A1  | 7/2019 |
| EP | 3 561 578 A1  | 10/2019 |
| JP | 2020-500328 A | 1/2020 |

(Continued)

OTHER PUBLICATIONS

Office Action issued Aug. 26, 2024, in corresponding Japanese Patent Application No. 2022-554234 (with English Translation), 11 pages.

(Continued)

*Primary Examiner* — Darryl J Collins
(74) *Attorney, Agent, or Firm* — Oblon, McClelland, Maier & Neustadt, L.L.P.

(57) ABSTRACT

A lens element intended to be worn in front of an eye of a wearer having a refraction area having a refractive power based on a prescription for said eye of the wearer, an a plurality of at least two optical elements having an optical function of not focusing an image on the retina of the eye of the wearer, wherein the refraction area comprises a plurality of respectively independent island-shaped areas, the refraction area is formed as the area other than the optical elements and each refraction island shape area is within one optical element.

15 Claims, 5 Drawing Sheets

(56) References Cited

U.S. PATENT DOCUMENTS

| | | | |
|---|---|---|---|
| 9,335,563 B2 * | 5/2016 | Weeber | G02C 7/044 |
| 11,623,318 B2 * | 4/2023 | Rego | B24B 49/02 |
| | | | 451/5 |
| 11,947,191 B2 * | 4/2024 | Qi | G02C 7/022 |
| 2017/0184875 A1 | 6/2017 | Newman | |
| 2018/0275427 A1 | 9/2018 | Lau et al. | |
| 2019/0227342 A1 | 7/2019 | Brennan et al. | |
| 2019/0235279 A1 | 8/2019 | Hones et al. | |
| 2020/0012123 A1 | 1/2020 | Newman | |
| 2020/0089023 A1 * | 3/2020 | Zhou | G02C 11/10 |
| 2020/0326559 A1 | 10/2020 | Hoshi | |
| 2021/0165244 A1 | 6/2021 | Hones et al. | |
| 2022/0390764 A1 * | 12/2022 | Matsuoka | G02C 7/024 |
| 2023/0004024 A1 * | 1/2023 | Ishizaki | G02C 7/022 |
| 2025/0216701 A1 * | 7/2025 | Bakaraju | G02C 7/086 |

FOREIGN PATENT DOCUMENTS

| | | |
|---|---|---|
| WO | WO 82/03129 A1 | 9/1982 |
| WO | WO 2013/149303 A1 | 10/2013 |
| WO | WO 2014/059465 A1 | 4/2014 |
| WO | WO 2015/147758 A1 | 10/2015 |
| WO | WO 2018/076057 A1 | 5/2018 |
| WO | WO 2019/124352 A1 | 6/2019 |
| WO | WO 2019/166659 A1 | 9/2019 |
| WO | WO 2019/206569 A1 | 10/2019 |

OTHER PUBLICATIONS

Japanese Office Action issued Feb. 12, 2025 in Japanese Patent Application No. 2022-554234, 10 pgs.

International Search Report & Written Opinion issued Jun. 23, 2021 in PCT/EP2021/058488, filed on Mar. 31, 2021, 14 pages.

* cited by examiner

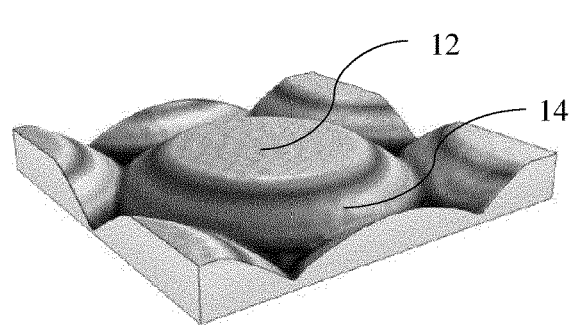
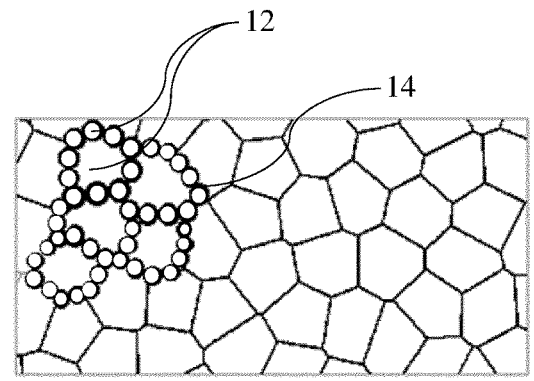
FIG. 3                   FIG. 5
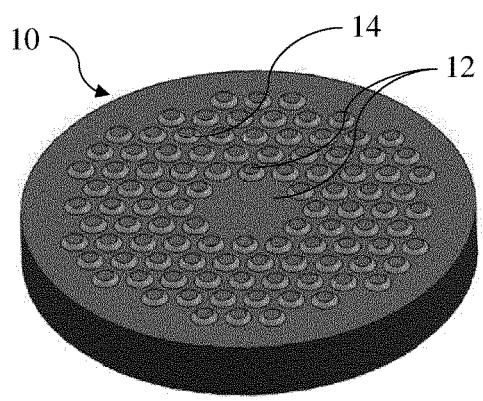
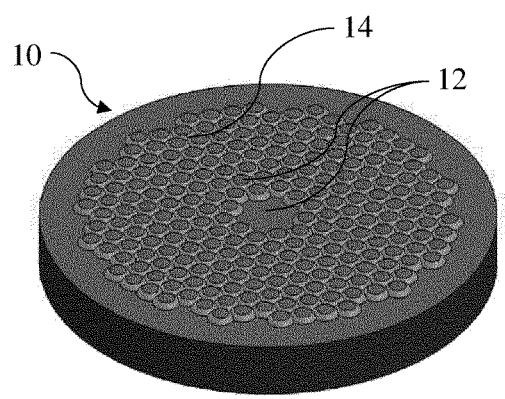
FIG. 4a                  FIG. 4b
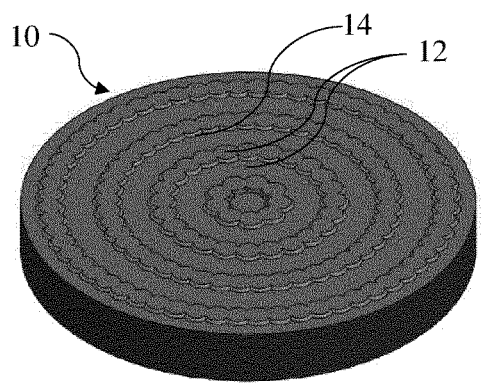
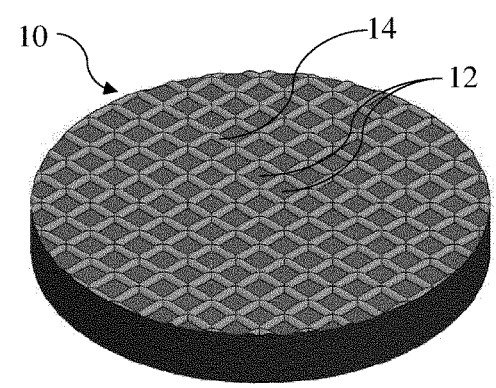
FIG. 4c                  FIG. 4d

LENS ELEMENT

TECHNICAL FIELD

The disclosure relates to a lens element intended to be worn in front of an eye of a person to suppress or reduce progression of abnormal refractions of the eye such as myopia or hyperopia, as well as the associated machining method to obtain such lens.

The disclosure further relates to a mold for a lens element intended to be worn in front of an eye of a person.

BACKGROUND OF THE DISCLOSURE

Myopia of an eye is characterized by the fact that the eye focuses distant objects in front of its retina. Myopia is usually corrected using a concave lens and hyperopia is usually corrected using a convex lens.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time.

Foveal vision corresponds to viewing conditions for which the image of an object looked at is formed by the eye in the central zone of the retina, called the foveal zone.

Peripheral vision corresponds to the perception of elements of a scene that are offset laterally relative to the object looked at, the images of said elements being formed on the peripheral portion of the retina, away from the foveal zone.

The ophthalmic correction with which an ametropic subject is provided is usually adapted for his foveal vision. However, as is known, the correction has to be reduced for the peripheral vision relative to the correction that is determined for the foveal vision. In particular, studies carried out on monkeys have shown that strong defocusing of the light behind the retina, which occurs away from the foveal zone, may cause the eye to elongate and therefore may cause a myopia defect to increase.

Therefore, it appears that there is a need for a lens element that would suppress or at least slow down progression of abnormal refractions of the eye such as myopia or hyperopia.

SUMMARY OF THE DISCLOSURE

To this end, the disclosure proposes a lens element intended to be worn in front of an eye of a wearer comprising:
 a refraction area having a refractive power based on a prescription for said eye of the wearer; and
 a plurality of at least two optical elements having an optical function of not focusing an image on the retina of the eye of the wearer, for example so as to slow down the progression of the abnormal refraction of the eye, wherein the refraction area comprises a plurality of respectively independent island-shaped areas, the refraction area is formed as the area other than the optical elements and each refraction island shape area is within one optical element.

Advantageously, having optical elements that are configured to not focus an image on the retina of the wearer reduces the natural tendency of the retina of the eye to deform, in particular to extend. Therefore, the progression of the abnormal refraction of the eye is slow down.

Furthermore, having the refraction area comprising a plurality of respectively independent island-shaped areas, each of them being formed within an optical element allows improving the correction of the abnormal refraction of the eye of the wearer.

In other words, the lens according to the disclosure allows reducing the progression of the abnormal refraction of the eye of the wearer while maintaining a perfect vision by correcting efficiently said abnormal refraction of the eye.

According to further embodiments which can be considered alone or in combination:
 at least part, for example all, of the optical elements have an annular shape around a refraction area; and/or
 at least two, for example all, of the optical elements are contiguous; and/or
 the optical elements have a contour shape being inscribable in a circle having a diameter greater than or equal to 0.8 mm and smaller than or equal to 3.0 mm; and/or
 the optical elements are positioned along a plurality of concentric rings; and/or
 the optical elements are positioned on a structured mesh; and/or
 the structured mesh is a squared mesh or a hexagonal mesh or a triangle mesh or an octagonal mesh; and/or
 the mesh structure is a random mesh, for example a Voronoi mesh; and/or
 at least one, for example all, of the optical element has an optical function of focusing an image on a position other than the retina in standard wearing conditions; and/or
 the optical elements are configured so that the mean focus of the light rays passing through each optical element is at a same distance to the retina; and/or
 at least one, for example all, of the optical element has a non-spherical optical function in standard wearing conditions; and/or
 at least one, for example all, of the optical elements has a cylindrical power and/or
 at least part, for example all, of the optical elements have a constant optical power and a discontinuous first derivative between two contiguous optical elements; and/or
 at least part, for example all, of the optical elements have a varying optical power and a discontinuous first derivative between two contiguous optical elements; and/or
 the optical elements are configured so that along at least one section of the lens the mean sphere of optical elements varies from a point of said section towards the peripheral part of said section; and/or
 the optical elements are configured so that along at least one section of the lens the cylinder of optical elements varies from a point of said section towards the peripheral part of said section; and/or
 the optical elements are configured so that along the at least one section of the lens the mean sphere and/or the cylinder of optical elements increases from the center of said section towards the peripheral part of said section; and/or
 the refraction area comprises an optical center and the optical elements are configured so that along any section passing through the optical center of the lens the mean sphere and/or the cylinder of the optical elements increases from the optical center towards the peripheral part of the lens; and/or the refraction area comprises a far vision reference point, a near vision reference, and a meridian joining the far and near vision reference points, the optical elements are configured so that in standard wearing conditions along any horizontal section of the lens the mean sphere and/or the cylinder of the optical elements increases from the intersection of said horizontal section with the meridian towards the peripheral part of the lens; and/or the mean sphere and/or the cylinder increase function along the sections are different depending on the position of said section along the meridian; and/or the mean sphere and/or the cylinder increase function along the sections are unsymmetrical; and/or the optical elements are configured so that in standard wearing condition the at least one section is a horizontal section; and/or the mean sphere and/or the cylinder of optical elements increases from a first point of said section towards the peripheral part of said section and decreases from a second point of said section towards the peripheral part of said section, the second point being closer to the peripheral part of said section than the first point; and/or the mean sphere and/or the cylinder increase function along the at least one section is a Gaussian function; and/or the mean sphere and/or the cylinder increase function along the at least ne section is a Quadratic function; and/or the optical elements are configured so that along at least one section of the lens, the size of the optical elements varies from a point of said section towards the peripheral part of said section; and/or the optical elements size varying function is monotonous; and/or the optical elements are configured so that along at least one section of the lens, the size of the optical elements increases from a point of said section towards the peripheral part of said section; and/or the optical elements are configured so that along at least one section of the lens, the size of the optical elements decreases from a point of said section towards the peripheral part of said section; and/or the size of the optical elements increases from a first point of a section of the lens towards the peripheral part of said section and decreases from a second point of said section towards the peripheral part of said section, the second point being closer to the peripheral part of said section than the first point; and/or the optical elements are configured so that along at least one section of the lens, the size of the independent island shaped areas forming the refraction area 12 varies from a point of said section towards the peripheral part of said section; and/or the independent island shaped areas size varying function is monotonous; and/or the optical elements are configured so that along at least one section of the lens, the size of the independent island shaped areas forming the refraction area 12 increases from a point of said section towards the peripheral part of said section; and/or the optical elements are configured so that along at least one section of the lens, the size of the independent island shaped areas forming the refraction area 12 decreases from a point of said section towards the peripheral part of said section; and/or the size of the independent island shaped areas forming the refraction area 12 increases from a first point of a section of the lens towards the peripheral part of said section and decreases from a second point of said section towards the peripheral part of said section, the second point being closer to the peripheral part of said section than the first point; and/or the optical elements size and/or independent island shaped areas increase function along the at least one section is a Gaussian function; and/or the optical elements size and/or independent island shaped areas increase function along the at least one section is a Quadratic function; and/or at least part, for example all, of the optical elements are located on the front surface of the lens element; and/or at least part, for example all, of the optical elements are located on the back surface of the ophthalmic lens; and/or at least part, for example all, of the optical elements are located between the front and the back surfaces of the ophthalmic lens; and/or the sphere, for example the mean sphere, of at least part, for example all, of the optical elements increases within said optical element with eccentricity; and/or the lens element further comprise at least four optical elements organized in at least two groups of contiguous optical elements; and/or each group of contiguous optical element is organized in at least two concentric rings having the same center, the concentric ring of each group of contiguous optical element being defined by an inner diameter corresponding to the smallest circle that is tangent to at least one optical element of said group and an outer diameter corresponding to the largest circle that is tangent to at least one optical elements of said group;

at least part of, for example all, the concentric rings of optical elements are centered on the optical center of the surface of the lens element on which said optical elements are disposed; and/or the concentric rings of optical elements have a diameter comprised between 9.0 mm and 60 mm; and/or the optical element further comprises optical elements positioned radially between two concentric rings; and/or the refractive area is formed as the area other than the areas formed as the plurality of optical elements; and/or for every circular zone having a radius comprised between 2 and 4 mm comprising a geometrical center located at a distance of the framing reference that faces the pupil of the user gazing straight ahead in standard wearing conditions greater or equal to said radius+5 mm, the ratio between the sum of areas of the parts of optical elements located inside said circular zone and the area of said circular zone is comprised between 20% and 70%; and/or at least one of the optical elements is a multifocal refractive micro-lens; and/or the at least one multifocal refraction micro-lens comprises a cylindrical power; and/or the at least one multifocal refractive micro-lens comprises an aspherical surface, with or without any rotational symmetry; and/or at least one of the optical elements is a toric refractive micro-lens; and/or the at least one multifocal refractive micro-lens comprises a toric surface; and/or at least one of the optical elements is made of a birefringent material; and/or at least one optical element has a shape configured so as to create a caustic in front of the retina of the eye of the person; and/or at least one optical element is a multifocal binary component; and/or at least one optical element is a pixelated lens; and/or at least part, for example all, optical functions comprise high order optical aberrations; and/or the refraction area is further configured to provide to the wearer in standard wearing conditions and for foveal vision a second optical power different from the first optical power; and/or the difference between the first optical power and the second optical power is greater than or equal to 0.5D.

The disclosure further relates to a method of machining a lens element intended to be worn in front of an eye of a wearer, wherein the method comprises:

providing an initial lens element comprising at least one support surface comprising a plurality of at least two optical elements having an optical function of not focusing an image on the retina of the eye of the wearer, for example so as to slow down the progression of the abnormal refraction of the eye, machining at least part of the plurality of optical elements so as to have over part of the optical elements surfaces a surface parallel to the support surface.

Advantageously, machining the plurality of optical elements to have their over part surfaces parallel to the support surface improve in terms of efficiency, cost reduction, and resources required, the process to obtain a lens element that reduces the progression of the abnormal refraction of the eye of the wearer while maintaining a good visual acuity for the wearer.

Another aspect of the disclosure relates to a mold for a lens element comprising a plurality of optical elements having a targeted optical function, comprising:

a first molding element having a first surface, the first surface having a first curvature and comprising a plurality of first surfacic elements having a curvature substantially identical to the first curvature and a plurality of second surfacic elements having at least a second curvature that differs from the first, the first surfacic elements being respectively independent island-shaped elements;

a second molding element having a second surface, a gasket having an inner and an outer surface, wherein the first surface of the first molding element, the second surface of the second element and the inner surface of the gasket form a molding cavity in which a molding material is to be filled.

According to further embodiments which can be considered alone or in combination:

each first surfacic element is within one second surfacic element; and/or at least part, for example all, of the second surfacic element have an annular shape around the first surface; and/or at least two, for example all, of the second surfacic elements are contiguous; and/or the second surfacic elements have a contour shape being inscribable in a circle having a diameter greater than or equal to 0.8 mm and smaller than or equal to 3.0 mm; and/or the second surfacic elements are positioned along a plurality of concentric rings; and/or the second surfacic elements are positioned on a structured mesh; and/or the structured mesh is a squared mesh or a hexagonal mesh or a triangle mesh or an octagonal mesh; and/or the mesh structure is a random mesh, for example a Voronoi mesh; and/or at least one, for example all, of the second surfacic elements has a non-spherical surface; and/or at least one, for example all, of the second surfacic elements have a toric surface and/or at least part, for example all, of the second surfacic elements have a constant curvature and a discontinuous first derivative between two contiguous second surfacic elements; and/or at least part, for example all, of the second surfacic elements have a varying curvature and a discontinuous first derivative between two contiguous second surfacic elements; and/or the second surfacic elements are configured so that along at least one section of the mold the mean curvature of second surfacic elements varies from a point of said section towards the peripheral part of said section; and/or the second surfacic elements are configured so that along at least one section of the mold the cylinder of second surfacic elements varies from a point of said section towards the peripheral part of said section; and/or the second surfacic elements are configured so that along the at least one section of the mold the mean curvature and/or the cylinder of second surfacic elements increases from the center of said section towards the peripheral part of said section; and/or the mean curvature and/or the cylinder increase function along the sections are different depending on the position of said section along the meridian; and/or the mean curvature and/or the cylinder increase function along the sections are unsymmetrical; and/or the mean curvature and/or the cylinder of optical elements increases from a first point of said section towards the peripheral part of said section and decreases from a second point of said section towards the peripheral part of said section, the second point being closer to the peripheral part of said section than the first point; and/or the mean curvature and/or the cylinder increase function along the at least one section is a Gaussian function; and/or the mean curvature and/or the cylinder increase function along the at least one section is a Quadratic function; and/or the curvature of at least part, for example all, of the second surfacic elements increases within said optical element with eccentricity; and/or the mold further comprise at least four second surfacic elements organized in at least two groups of contiguous second surfacic elements; and/or each group of contiguous second surfacic elements is organized in at least two concentric rings having the same center, the concentric ring of each group of contiguous second surfacic elements being defined by an inner diameter corresponding to the smallest circle that is tangent to at least one second surfacic element of said group and an outer diameter corresponding to the largest circle that is tangent to at least one second surfacic element of said group;

at least part of, for example all, the concentric rings of second surfacic elements are centered on the center of the first surface of the mold on which said second surfacic elements are disposed; and/or the concentric rings of second surfacic elements have a diameter comprised between 9.0 mm and 60 mm; and/or the mold further comprises second surfacic elements positioned radially between two concentric rings; and/or the difference between the first curvature and the second curvature is greater than or equal to 0.5 D.

BRIEF DESCRIPTION OF THE DRAWINGS

Non-limiting embodiments of the disclosure will now be described with reference to the accompanying drawing wherein:

FIG. 3 illustrates a close-up view of an optical element according to an embodiment of the disclosure;

FIGS. 4a to 4d illustrates examples of optical elements organization on a lens element according to the disclosure;

FIG. 5 illustrates an example of optical elements organization on a lens element according to the disclosure;

Elements in the figures are illustrated for simplicity and clarity and have not necessarily been drawn to scale. For example, the dimensions of some of the elements in the figure may be exaggerated relative to other elements to help to improve the understanding of the embodiments of the present disclosure.

DETAILED DESCRIPTION OF EMBODIMENTS OF THE DISCLOSURE

The disclosure relates to a lens element intended to be worn in front of an eye of a wearer.

In the reminder of the description, terms like «up», «bottom», «horizontal», «vertical», «above», «below», «front», «rear» or other words indicating relative position may be used. These terms are to be understood in the wearing conditions of the lens element.

In the context of the present disclosure, the term "lens element" can refer to an uncut optical lens or a spectacle optical lens edged to fit a specific spectacle frame or an ophthalmic lens and an optical device adapted to be positioned on the ophthalmic lens. The optical device may be positioned on the front or back surface of the ophthalmic lens. The optical device may be an optical patch. The optical device may be adapted to be removably positioned on the ophthalmic lens for example a clip configured to be clipped on a spectacle frame comprising the ophthalmic lens.

A lens element 10 according to the disclosure is adapted for a wearer and intended to be worn in front of an eye of said wearer.

Figure 1:
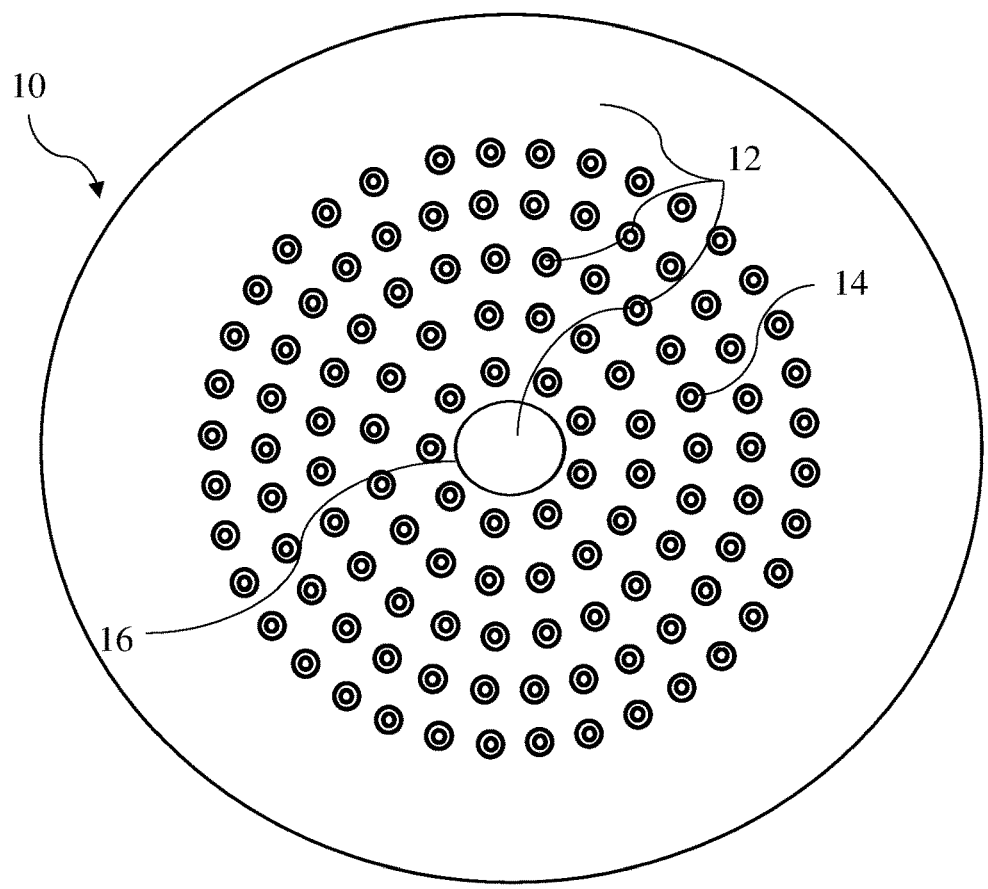
FIG. 1 is a plan view of a lens element according to an embodiment of the disclosure.

As represented on FIG. 1, a lens element 10 according to the disclosure comprises:
a refraction area 12, and
a plurality of contiguous optical elements 14.

As illustrated on FIG. 1, the refraction area 12 comprises a plurality of respectively independent island-shaped areas.

In the sense of the disclosure, two optical elements are considered as independent if producing independent images.

In particular, when illuminated by a parallel beam "in central vision", each "independent contiguous optical element" forms on a plane in the image space a spot associated with it. In other words, when one of the "optical element" is hidden, the spot disappears even if this optical element is contiguous with another optical element.

The refractive area is preferably formed as the area other than the areas formed as the plurality of optical elements. In other words, the refractive area is the complementary area to the areas formed by the plurality of optical elements.

The refraction area 12 is configured to provide to the wearer in standard wearing conditions, in particular for foveal vision, a first optical power based on the prescription of the wearer for correcting an abnormal refraction of said eye of the wearer.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens, for example, equal to 12 mm.

The Pupil-cornea distance is the distance along the visual axis of the eye between its pupil and cornea, usually equal to 2 mm.

The CRE to pupil distance is the distance along the visual axis of the eye between its center of rotation (CRE) and cornea, for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of −8°, a Cornea to lens distance of 12 mm, a Pupil-cornea distance of 2 mm, a CRE to pupil distance of 11.5 mm, a CRE to lens distance of 25.5 mm and a wrap angle of 0°.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

Although the disclosure is not directed to progressive lenses, the wording used in this description is illustrated in FIGS. 1 to 10 of document WO2016/146590 for a progressive lens. The skilled person can adapt the definitions for single vision lenses.

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in diopters.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in diopters.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labelled $SPH_{min}$ and $SPH_{max}$ can be deduced according to the kind of surface considered.

When the surface considered is the object side surface (also referred to as the front surface), the expressions are the following:

$$SPH_{min} = (n-1)*CURV_{min} = \frac{n-1}{R_{max}}, \text{ and}$$

$$SPH_{min} = (n-1)*CURV_{min} = \frac{n-1}{R_{max}}$$

where n is the index of the constituent material of the lens.

If the surface considered is an eyeball side surface (also referred to as the back surface), the expressions are the following:

$$SPH_{min} = (1-n)*CURV_{min} = \frac{1-n}{R_{max}} \text{ and}$$

$$SPH_{max} = (1-n)*CURV_{max} = \frac{1-n}{R_{min}}$$

where n is the index of the constituent material of the lens.

As is well known, a mean sphere SPHmean at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

a cylinder CYL is also defined by the formula $CYL=|SPH_{max}-SPH_{min}|$.

The characteristics of any aspherical face of the lens may be expressed by the local mean spheres and cylinders. A surface can be considered as locally non-spherical when the cylinder is at least 0.25 diopters.

Figure 6A:
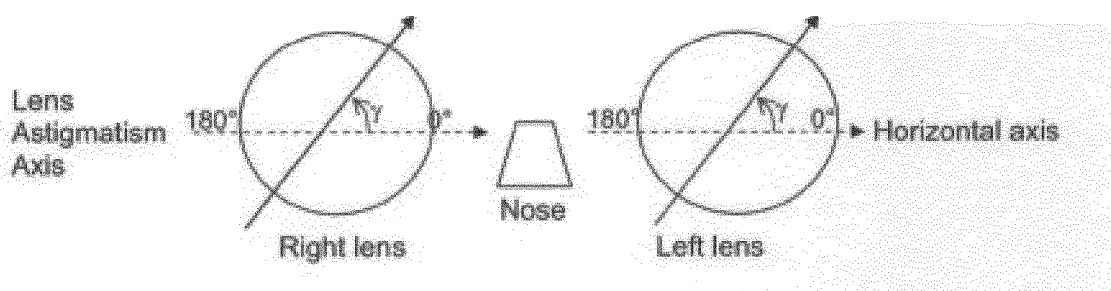
FIG. 6a illustrates the astigmatism axis γ of a lens in the TABO convention.
Figure 6B:
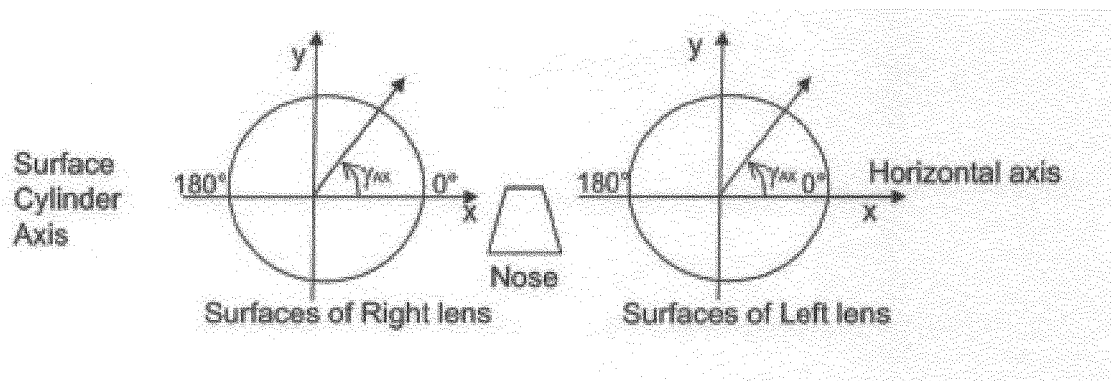
FIG. 6b illustrates the cylinder axis $\gamma_{AX}$ in a convention used to characterize an aspherical surface.

For an aspherical surface, a local cylinder axis γAX may further be defined. FIG. 6a illustrates the astigmatism axis γ as defined in the TABO convention and FIG. 6b illustrates the cylinder axis γAX in a convention defined to characterize an aspherical surface.

The cylinder axis γAX is the angle of the orientation of the maximum curvature CURVmax with relation to a reference axis and in the chosen sense of rotation. In the above defined convention, the reference axis is horizontal (the angle of this reference axis is 0°) and the sense of rotation is counter-clockwise for each eye, when looking at the wearer (0°≤γAX≤180°). An axis value for the cylinder axis γAX of +45° therefore represents an axis oriented obliquely, which when looking at the wearer, extends from the quadrant located up on the right to the quadrant located down on the left.

Moreover, a progressive multifocal lens may also be defined by optical characteristics, taking into consideration the situation of the person wearing the lenses.

Figure 7:
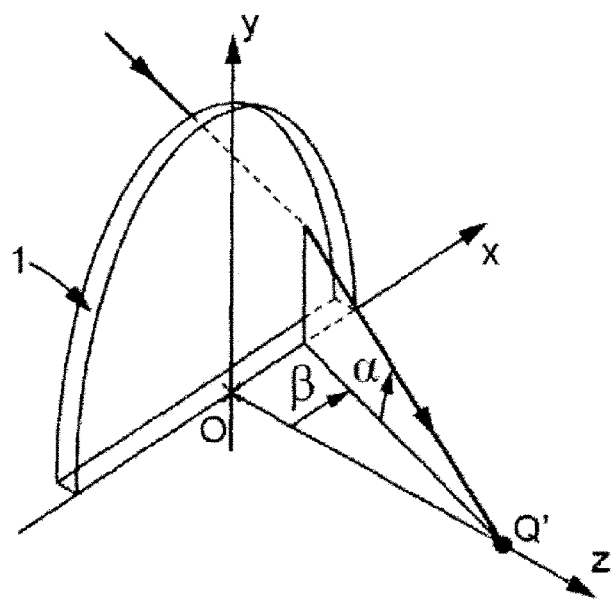
FIGS. 7 and 8 show, diagrammatically, optical systems of eye and lens.
Figure 8:
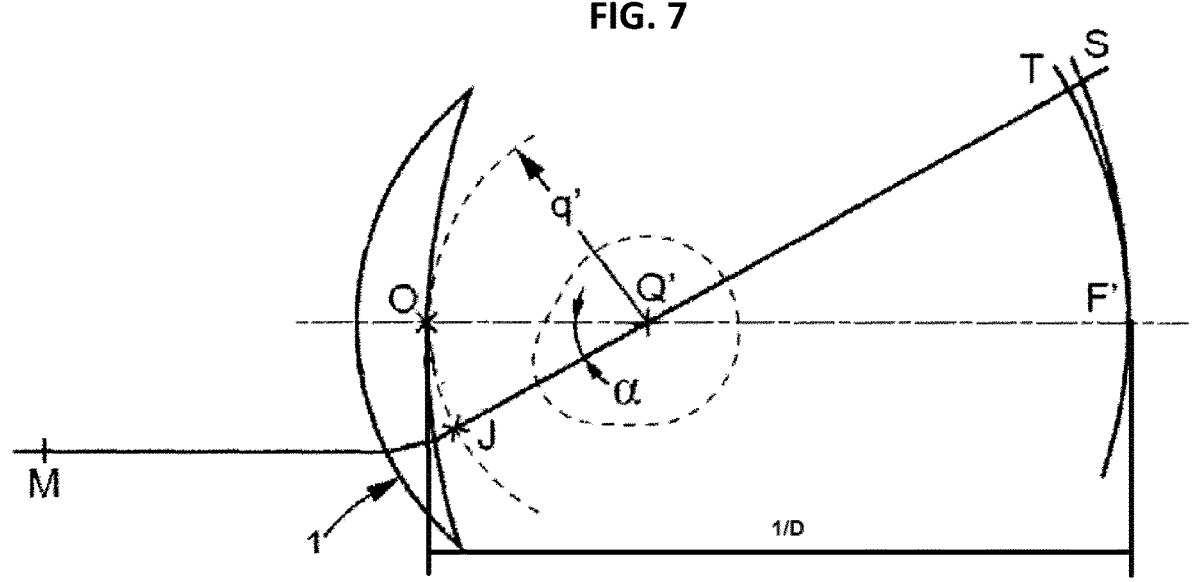

FIGS. 7 and 8 are diagrammatic illustrations of optical systems of eye and lens, thus showing the definitions used in the description. More precisely, FIG. 7 represents a perspective view of such a system illustrating parameters α and β used to define a gaze direction. FIG. 8 is a view in the vertical plane parallel to the antero-posterior axis of the wearer's head and passing through the center of rotation of the eye in the case when the parameter β is equal to 0.

The center of rotation of the eye is labelled Q'. The axis Q'F', shown on FIG. 8 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis.

As examples, a value of radius q' of 25.5 mm corresponds to a usual value and provides satisfying results when wearing the lenses.

A given gaze direction—represented by a solid line on FIG. 7—corresponds to a position of the eye in rotation around Q' and to a point J of the apex sphere; the angle R is the angle formed between the axis Q'F' and the projection of the straight line Q'J on the horizontal plane comprising the axis Q'F'; this angle appears on the scheme on FIG. 7. The angle α is the angle formed between the axis Q'J and the projection of the straight line Q'J on the horizontal plane comprising the axis Q'F'; this angle appears on the scheme on FIGS. 7 and 8. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modelling method. For a method of the disclosure, points may be at infinity or not. Ergorama may be a function of the wearer's ametropia or wearer's addition.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere:

$$ProxO = \frac{1}{MJ}$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

Pui=ProxO+ProxI

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame {Q', xm, ym, zm} linked to the eye. It corresponds to the angle with which the image S or T i formed depending on the convention used with relation to the direction zm in the plane {Q', zm, ym}.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

The refractive area 12 may further be configured to provide to the wearer, in particular for foveal vision, a second optical power different from the first optical power based on the prescription of the wearer.

In the sense of the disclosure, the two optical powers are considered different when the difference between the two optical powers is greater than or equal to 0.5 D.

When the abnormal refraction of the eye of the person corresponds to myopia the second optical power is greater than the first optical power.

When the abnormal refraction of the eye of the person corresponds to hyperopia, the second optical power is smaller than the first optical power.

As illustrated in FIGS. 1 and 3, each independent island-shaped area constituting the refraction area 12 are formed within one optical element 14. In other words, each optical element 14 surrounds an island-shaped area.

The lens element according to the disclosure comprises a plurality of at least two optical elements 14.

At least one, preferably all of the, optical element of the plurality of optical elements 14, has an optical function of not focusing an image on the retina of the eye of the wearer, in particular for peripheral vision and preferably for central and peripheral vision.

In the sense of the disclosure "focusing" is to be understood as producing a focusing spot with a circular section that can be reduced to a point in the focal plane or the size of the diffraction spot.

Advantageously, such optical function of the optical element reduces the deformation of the retina of the eye of the wearer in peripheral vision, allowing to slow down the progression of the abnormal refraction of the eye of the person wearing the lens element.

According to a preferred embodiment of the disclosure represented on FIGS. 1, 3 and 4*a* to 4*b*, at least part, for example all, of the optical elements have an annular shape around a refraction area.

Advantageously, such configuration provides a good repartition of the refraction area and optical elements thereby allowing to provide a better correction of the abnormal refraction of the eye of the wearer while maintaining the effective function of the optical elements to reduce, or at least slow down, the progression of said abnormal refraction.

According to an embodiment of the disclosure, the plurality of at least two optical elements are contiguous. FIGS. 4b to 4d illustrates examples of contiguous optical elements in the sense of the disclosure.

In the sense of the disclosure, two optical elements located on a surface of the lens element are contiguous if there is a path supported by said surface that links the two optical elements and if along said path one does not reach the basis surface on which the optical elements are located.

When the surface on which the at least two optical elements are located is spherical, the basis surface corresponds to said spherical surface. In other words, two optical elements located on a spherical surface are contiguous if there is a path supported by said spherical surface and linking them and if along said path one may not reach the spherical surface.

When the surface on which the at least two optical elements are located is non-spherical, the basis surface corresponds to the local spherical surface that best fit said non-spherical surface. In other words, two optical elements located on a non-spherical surface are contiguous if there is a path supported by said non-spherical surface and linking them and if along said path one may not reach the spherical surface that best fit the non-spherical surface.

Advantageously, having contiguous optical elements helps improving the aesthetic of the lens element and is easier to manufacture.

The lens element may comprise at least four optical elements organized in at least two groups of contiguous optical elements. FIG. 4c illustrates an example of optical elements organized in four groups of contiguous optical elements.

According to an embodiment of the disclosure, the optical elements have specific sizes. In particular, the optical elements have a contour shape being inscribable in a circle having a diameter greater than or equal to 0.8 mm and smaller than or equal to 3.0 mm, preferably greater than or equal to 1.0 mm and smaller than 2.0 mm.

According to embodiments of the disclosure, the optical elements are positioned on a mesh.

The mesh on which the optical elements are positioned may be a structured mesh as illustrated on FIGS. 1 and 4a to 4d.

According to a preferred embodiment of the disclosure, the optical elements are positioned on a structured mesh being a squared mesh or a hexagonal mesh or a triangle mesh or an octagonal mesh. For example, FIGS. 4a and 4b illustrate a hexagonal mesh of optical elements 14 having an annular shape around refraction areas 12. In particular, the geometrical centers of the optical elements may be organized on a mesh, for example a hexagonal mesh, or a square mesh, or a triangle mesh, or an octagonal mesh.

In the embodiments illustrated on FIGS. 1 and 4c the optical elements are positioned along a plurality of concentric rings.

The concentric rings of optical elements may be annular rings.

According to an embodiment of the disclosure, the lens element further comprises at least four optical elements. The at least four optical elements are organized in at least two groups of optical elements, each group of optical elements being organized in at least two concentric rings having the same geometrical center, the concentric ring of each group of contiguous optical element being defined by an inner diameter and an outer diameter.

The inner diameter of a concentric ring of each group of optical elements corresponds to the smallest circle that is tangent to at least one optical element of said group of optical elements. The outer diameter of a concentric ring of optical element corresponds to the largest circle that is tangent to at least one optical element of said group.

For example, the lens element may comprise n rings of optical elements, $f_{inner\ 1}$ referring to the inner diameter of the concentric ring which is the closest to the optical center of the lens element, $f_{outer\ 1}$ referring to the outer diameter of the concentric ring which is the closest to the optical center of the lens element, $f_{inner\ n}$ referring to the inner diameter of the ring which is the closest to the periphery of the lens element, and $f_{outer\ n}$ referring to the outer diameter of the concentric ring which is the closest to the periphery of the lens element.

The distance $D_i$ between two successive concentric rings of optical elements i and i+1 may be expressed as:

$$D_i = |f_{inner\ i+1} - f_{outer\ i}|,$$

wherein $f_{outer\ i}$ refers to the outer diameter of a first ring of optical elements i and $f_{inner\ i+1}$ refers to the inner diameter of a second ring of optical elements i+1 that is successive to the first one and closer to the periphery of the lens element.

According to another embodiment of the disclosure, the optical elements are organized in concentric rings centered on the optical center of the surface of the lens element on which the optical elements are disposed and linking the geometrical center of each optical element.

For example, the lens element may comprise n rings of optical elements, $f_1$ referring to the diameter of the ring which is the closest to the optical center of the lens element and $f_n$ referring to the diameter of the ring which is the closest to the periphery of the lens element.

The distance $D_i$ between two successive concentric rings of optical elements i and i+1 may be expressed as:

$$D_i = \left| f_{i+1} - f_i - \frac{d_{i+1}}{2} - \frac{d_i}{2} \right|,$$

wherein $f_1$ refers to the diameter of a first ring of optical elements i and $f_{i+1}$ refers to the diameter of a second ring of optical elements i+1 that is successive to the first one and closer to the periphery of the lens element, and wherein $d_i$ refers to the diameter of the optical elements on the first ring of optical elements and $d_{i+1}$ refers to the diameter of the optical elements on the second ring of optical elements that is successive to the first ring and closer to the periphery of the lens element. The diameter of the optical element corresponds to the diameter of the circle in which the contour shape of the optical element is inscribed.

Advantageously, the optical center of the lens element and the center of the concentric rings of optical elements coincide. For example, the geometrical center of the lens element, the optical center of the lens element, and the center of the concentric rings of optical elements coincide.

In the sense of the disclosure, the term coincide should be understood as being really close together, for example distanced by less than 1.0 mm.

The distance $D_i$ between two successive concentric rings may vary according to i. For example, the distance $D_i$ between two successive concentric rings may vary between 1.0 mm and 5.0 mm.

According to an embodiment of the disclosure, the distance $D_i$ between two successive concentric rings of optical elements is greater than 1.00 mm, preferably 2.0 mm, more preferably 4.0 mm.

Advantageously, having the distance $D_i$ between two successive concentric rings of optical elements greater than 1.00 mm allows managing a larger refraction area between these rings of optical elements and thus provides better visual acuity.

In other words, the inventors have observed that for a given value of the abovementioned ratio, the organization of contiguous optical elements in concentric rings, where these rings are spaced by a distance greater than 2.0 mm, allows providing annular zones of refractive area easier to manufacture than the refractive area managed when optical element are disposed in hexagonal mesh or randomly disposed on the surface of the lens element. thereby provide a better correction of the abnormal refraction of the eye and thus a better visual acuity.

According to an embodiment of the disclosure, the diameter di of all optical elements of the lens element are identical.

According to an embodiment of the disclosure, the distances $D_i$ between two successive concentric rings i and i+1 may increase when i increases towards the periphery of the lens element.

The concentric rings of optical elements may have a diameter comprised between 9 mm and 60 mm.

According to an embodiment of the disclosure, the lens element comprises optical elements disposed in at least 2 concentric rings, preferably more than 5, more preferably more than 10 concentric rings. For example, the optical elements may be disposed in 11 concentric rings centered on the optical center of the lens.

On FIG. 1, the optical elements are positioned along a set of 5 concentric rings. The optical power and/or cylinder of the micro-lenses may be different depending on their position along the concentric rings.

According to an embodiment of the disclosure, the lens element may further comprise optical elements 14 positioned radially between two concentric rings. For example, four optical elements are placed between two concentric rings, preferably, more optical elements may be positioned between both rings.

Alternatively, the optical elements may be placed on a random structure mesh such as a Voronoi mesh as illustrated on FIG. 5.

Advantageously, having the optical elements placed on a random structure limits the risk of light scattering or diffraction.

According to embodiments of the disclosure, at least part, for example all of the optical elements have a constant optical power and a discontinuous first derivative between two contiguous optical elements. In other words, there is no area between the junction of two contiguous optical elements with no sphere.

Alternatively, at least part, for example all, of the optical elements have a varying optical power and a discontinuous first derivative between the junction of two contiguous optical elements.

To obtain such variation, here one may use two constant powers, one positive and one negative. The area of the negative power is much smaller than the area of the positive power, so that globally one has a positive power effect.

Figure 2:
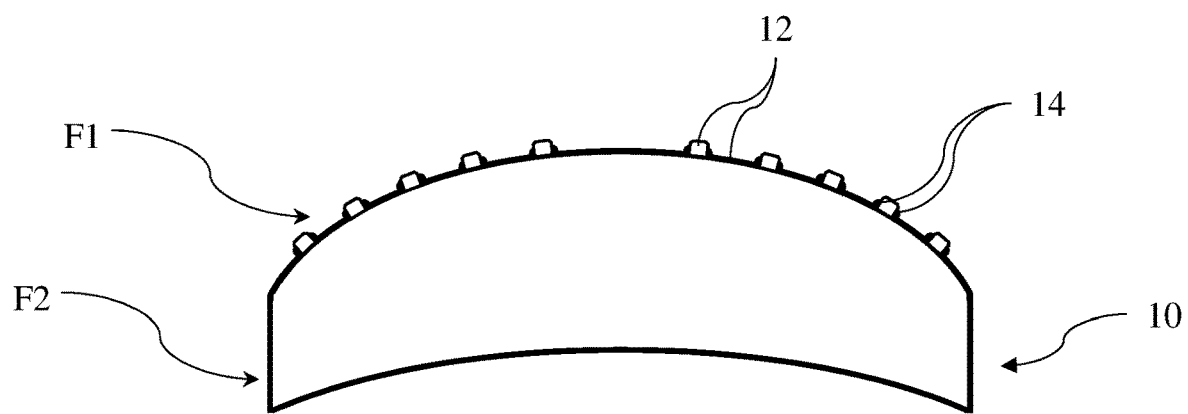
FIG. 2 is a general profile view of a lens element according to an embodiment of the disclosure.

As illustrated on FIG. 2, a lens element 10 according to the disclosure comprises an object side surface F1 formed as a convex curved surface toward an object side, and an eye side surface F2 formed as a concave surface having a different curvature than the curvature of the object side surface F1.

According to an embodiment of the disclosure, at least part, for example all, of the optical elements are located on the front surface of the lens element.

At least part, for example all, of the optical elements may be located on the back surface of the lens element.

At least part, for example all, of the optical elements may be located between the front and back surfaces of the lens element. For example, the lens element may comprise zones of different refractive index forming the optical elements.

According to an embodiment of the disclosure, at least part, for example all, of the optical elements has an optical function of focusing an image on a position other than the retina.

Preferably, at least 50%, for example at least 80%, for example all, of the optical elements have an optical function of focusing an image for peripheral vision on a position other than the retina.

According to a preferred embodiment of the disclosure, all of the optical elements are configured so that the mean focus of the light rays passing through each optical element is at a same distance to the retina of the wearer, at least for peripheral vision.

The optical function, in particular the dioptric function, of each optical element may be optimized so as to provide a focus image, in particular in peripheral vision, at a constant distance of the retina of the eye of the wearer. Such optimization requires adapting the dioptric function of each of the optical element depending on their position on the lens element.

In particular, the inventors have determined that the spot diagram of the beam of light passing through a spherical 3D shaped micro lens analyzed in peripheral vision (30° from the pupil center) is not a point.

To obtain a point, the inventors have determined that the optical element should have a cylindrical power, for example have a toric shape.

According to an embodiment of the disclosure, at least one, for example all, of the optical element has a non-spherical optical function in standard wearing conditions.

According to another embodiment of the disclosure, at least one, for example all, of the optical elements has a cylindrical power.

According to an embodiment of the disclosure, the optical elements are configured so that at least along one section of the lens the mean sphere of the optical elements varies from a point of said section towards the periphery of said section.

The optical elements may further be configured so that at least along one section of the lens, for example at least the same section as the one along which the mean sphere of the optical elements varies, the cylinder varies from a point of said section, for example the same point as for the mean sphere, towards the peripheral part of said section.

Advantageously, having optical elements configured so that along at least one section of the lens the mean sphere and/or mean cylinder of optical elements varies from a point of said section towards the peripheral part of said section allows varying the defocus of the light rays in front the retina in case of myopia or behind the retina in case of hyperopia.

In other words, the inventors have observed that having optical elements configured so that along at least one section of the lens the mean sphere of optical elements varies from a point of said section towards the peripheral part of said section helps slow down the progression of abnormal refraction of the eye such as myopia or hyperopia.

The optical elements may be configured so that that along the at least one section of the lens the mean sphere and/or the cylinder of optical elements increases from the center of said section towards the peripheral part of said section.

According to an embodiment of the disclosure, the optical elements are configured so that in standard wearing condition the at least one section is a horizontal section.

The lens element, and in particular, the refraction area may comprise an optical center and the optical elements may be configured so that along any section passing through the optical center of the lens, the mean sphere and/or the cylinder of the optical elements varies, for example increases, from the optical center towards the peripheral part of the lens.

The lens element, and in particular, the refraction area may comprise a far vision reference point, a near vision reference, and a meridian joining the far and near vision reference points. In such embodiment, the optical elements may be configured so that in standard wearing conditions along any horizontal section of the lens the mean sphere and/or the cylinder of the optical elements varies, for example increases, from the intersection of said horizontal section with the meridian towards the peripheral part of the lens.

Preferably, according to such embodiment, the optical elements are configured so that in standard wearing conditions along any horizontal section of the lens the mean sphere and/or the cylinder of the optical elements increases from the intersection of said horizontal section with the meridian line towards the peripheral part of the lens.

The meridian line corresponds to the locus of the intersection of the main gaze direction with the surface of the lens.

The mean sphere and/or the cylinder varying function, for example increase function, along the sections may be different depending on the position of said section along the meridian.

In particular, the mean sphere and/or the cylinder varying function, for example increase function, along the sections may be unsymmetrical. For example, the mean sphere and/or the cylinder increase function are unsymmetrical along vertical and/or horizontal section in standard wearing conditions.

The mean sphere and/or the cylinder may increase according to an increase function along the at least one horizontal section, the increase function being a Gaussian function. The Gaussian function may be different between the nasal and temporal part of the lens so as to take into account the dissymmetry of the retina of the person.

Alternatively, the mean sphere and/or the cylinder may vary according to an increase function along the at least one horizontal section, the increase function being a Quadratic function. The Quadratic function may be different between the nasal and temporal part of the lens so as to take into account the dissymmetry of the retina of the person.

According to an embodiment of the disclosure, the mean sphere and/or the cylinder of optical elements increases from a first point of said section towards the peripheral part of said section and decreases from a second point of said section towards the peripheral part of said section, the second point being closer to the peripheral part of said section than the first point.

Such embodiment is illustrated in table 1 that provides the mean sphere of optical elements according to their radial distance to the optical center of the lens element.

In the example of table 1, the optical elements are micro lens placed on a spherical front surface having a curvature of 329.5 mm and the lens element is made of an optical material having a refractive index of 1.591, the prescribed optical power of the wearer is of −6 D. The optical element is to be worn in standard wearing conditions and the retina of the wearer is considered as having a defocus of 0.8 D at an angle of 30°. The optical elements are determined to have a peripheral defocus of 2D.

TABLE 1

| Distance to optical center (mm) | Mean sphere of optical element (D) |
|---|---|
| 0 | 1.992 |
| 5 | 2.467 |
| 7.5 | 2.806 |
| 10 | 3.024 |
| 15 | 2.998 |
| 20 | 2.485 |

As illustrated in table 1, starting close to the optical center of the lens element, the mean sphere of the optical elements increases towards the peripheral part of said section and then decreases towards the peripheral part of said section.

According to an embodiment of the disclosure, the mean cylinder of optical elements increases from a first point of said section towards the peripheral part of said section and decreases from a second point of said section towards the peripheral part of said section, the second point being closer to the peripheral part of said section than the first point.

Such embodiment is illustrated in tables 2 and 3 that provides the amplitude of the cylinder vector projected on a first direction Y corresponding to the local radial direction and a second direction X orthogonal to the first direction.

In the example of table 2, the optical elements are micro-lenses placed on a spherical front surface having a curvature of 167.81 mm and the lens element is made of an optical material having a refractive index of 1.591, the prescribed optical power of the wearer is of −6 D. The optical element is to be worn in standard wearing conditions and the retina of the wearer is considered as having a defocus of 0.8 D at an angle of 30°. The optical elements are determined to have a peripheral defocus of 2D.

In the example of table 3, the optical elements are micro-lenses placed on a spherical front surface having a curvature of 167.81 mm and the lens element is made of an optical material having a refractive index of 1.591, the prescribed optical power of the wearer is of −1 D. The optical element is to be worn in standard wearing conditions and the retina of the wearer is considered as having a defocus of 0.8 D at an angle of 30°. The optical elements are determined to have a peripheral defocus of 2D.

TABLE 2

| gazing direction (in degree) | Px (in Diopter) | Py (in Diopter) | Cylinder (in Diopter) |
|---|---|---|---|
| 0 | 1.987 | 1.987 | 1.987 |
| 18.581 | 2.317 | 2.431 | 2.374 |
| 27.002 | 2.577 | 2.729 | 2.653 |
| 34.594 | 2.769 | 2.881 | 2.825 |

TABLE 2-continued

| gazing direction (in degree) | Px (in Diopter) | Py (in Diopter) | Cylinder (in Diopter) |
|---|---|---|---|
| 47.246 | 2.816 | 2.659 | 2.7375 |
| 57.02 | 2.446 | 1.948 | 2.197 |

TABLE 3

| gazing direction (in degree) | Px (in Diopter) | Py (in Diopter) | Cylinder (in Diopter) |
|---|---|---|---|
| 0 | 1.984 | 1.984 | 1.984 |
| 18.627 | 2.283 | 2.163 | 2.223 |
| 27.017 | 2.524 | 2.237 | 2.3805 |
| 34.526 | 2.717 | 2.213 | 2.465 |
| 46.864 | 2.886 | 1.943 | 2.4145 |
| 56.18 | 2.848 | 1.592 | 2.22 |

As illustrated in tables 2 and 3, starting close to the optical center of the lens element, the cylinder of the optical elements increases towards the peripheral part of said section and then decreases towards the peripheral part of said section.

For example, the optical elements may be regularly distributed along circles centered on the optical center of the refraction area.

The optical elements on the circle of diameter 10 mm and centered on the optical center of the refraction area may be micro lenses having a mean sphere of 2.75 D.

The optical elements on the circle of diameter 20 mm and centered on the optical center of the refraction area may be micro lenses having a mean sphere of 4.75 D.

The optical elements on the circle of diameter 30 mm and centered on the optical center of the refraction area may be micro lenses having a mean sphere of 5.5 D.

The optical elements on the circle of diameter 40 mm and centered on the optical center of the refraction area may be micro lenses having a mean sphere of 5.75 D.

The cylinder of the different optical elements may be adjusted based on the shape of the retina of the person.

According to an embodiment of the invention, the optical elements 14 are configured so that along at least one section of the lens the size of the optical elements varies from a point of said section towards the peripheral part of said section.

The size of the optical elements 14 may increase along said section of the lens element towards the periphery of the lens element.

Additionally, the size of the optical elements 14 may increase from a first point of said section of the lens element towards the peripheral part of said section and decrease from a second point of said section towards the peripheral part of said section, the second point being closer to the peripheral part of said section than the first point.

In particular, the size of the independent island-shaped areas forming the refraction area 12 may increase along said section of the lens element towards the periphery of the lens element.

Additionally, the size of the independent island-shaped areas forming the refraction area 12 may increase from a first point of said section of the lens element towards the peripheral part of said section and decreases from a second point of said section towards the peripheral part of said section, the second point being closer to the peripheral part of said section than the first point.

Alternatively, the size of the optical elements 14 may decrease along said section of the lens element towards the periphery of the lens element.

Additionally, the size of the optical elements may decrease from a first point of said section of the lens element towards the peripheral part of said section and increase from a second point of said section towards the peripheral part of said section, the second point being closer to the peripheral part of said section than the first point.

In particular, the size of the independent island-shaped areas forming the refraction area 12 may decrease along said section of the lens element towards the periphery of the lens element.

Additionally, the size of the independent island-shaped areas forming the refraction area 12 may decrease from a first point of said section of the lens element towards the peripheral part of said section and increase from a second point of said section towards the peripheral part of said section, the second point being closer to the peripheral part of said section than the first point.

According to an embodiment of the disclosure, at least one of the optical elements has a non-focused optical function in standard wearing conditions and for peripheral vision.

Preferably at least 50%, for example at least 80%, for example all, of the optical elements 14 have a non-focused optical function in standard wearing conditions and for peripheral vision.

In the sense of the disclosure, a "non-focused optical function" is to be understood as not having a single focus point in standard wearing conditions and for peripheral vision.

Advantageously, such optical function of the optical element reduces the deformation of the retina of the eye of the wearer, allowing to slow down the progression of the abnormal refraction of the eye of the person wearing the lens element.

The at least one optical element having a non-focused optical function is transparent.

Advantageously, the non-contiguous optical elements are not visible on the lens element and do not affect the aesthetics of the lens element.

According to an embodiment of the disclosure, the lens element may comprise an ophthalmic lens bearing the refraction area and a clip-on bearing the plurality of at least two optical elements adapted to be removably attached to the ophthalmic lens when the lens element is worn.

Advantageously, when the person is in a far distance environment, outside for example, the person may separate the clip-on from the ophthalmic lens and eventually substitute a second clip-on free of any of at least two optical elements. For example, the second clip-on may comprise a solar tint. The person may also use the ophthalmic lens without any additional clip-on.

The optical element may cover specific zones of the lens element, like at the center or any other area.

According to an embodiment of the disclosure, the central zone of the lens corresponding to a zone centered on the optical center of the lens element does not comprise any optical element. For example, the lens element may comprise an empty zone centered on the optical center of said lens element and having a diameter equal to 9 mm which does not comprise any optical element.

The optical center of the lens element may correspond to the fitting point of the lens.

Alternatively, the optical elements may be disposed on the entire surface of the lens element.

The optical element density or the quantity of power may be adjusted depending on zones of the lens element. Typically, the optical element may be positioned in the periphery of the lens element, in order to increase the effect of the optical element on myopia control, so as to compensate peripheral defocus due to the peripheral shape of the retina for example.

According to a preferred embodiment of the disclosure, every circular zone of the lens element having a radius comprised between 2 and 4 mm comprising a geometrical center located at a distance of the optical center of the lens element greater or equal to said radius+5 mm, the ratio between the sum of areas of the parts of optical elements located inside said circular zone and the area of said circular zone is comprised between 20% and 70%, preferably between 30% and 60%, and more preferably between 40% and 50%.

The surface considered when determining the area ratio may be either along the slope of the optical elements or by using the projected surface on the refractive area.

According to an embodiment of the disclosure, at least one, for example all, of the optical elements has a shape configured so as to create a caustic in front of the retina of the eye of the person. In other words, such optical element is configured so that every section plane where the light flux is concentrated if any, is located in front of the retina of the eye of the person.

According to an embodiment of the disclosure, the at least one, for example all, of the optical element having a non-spherical optical function is a multifocal refractive microlens.

In the sense of the disclosure, a "multifocal refractive microlens" includes bifocals (with two focal powers), trifocals (with three focal powers), progressive addition lenses, with continuously varying focal power, for example aspherical progressive surface lenses, and having an axis of symmetry and a rotationally symmetric continuously varying surfacic power around said axis.

According to an embodiment of the disclosure, at least one of the optical elements, preferably more than 50%, more preferably more than 80% of the optical elements are aspherical microlenses. In the sense of the disclosure, aspherical microlenses have a continuous power evolution over their surface.

An aspherical microlens may have an asphericity comprised between 0.1 D and 3D. The asphericity of an aspherical microlens corresponds to the ratio of optical power measured at a first point of the optical element and the optical power measured at a second point of the microlens element, the first and second points being disposed at different radial distance from the geometric center of the optical element.

According to an embodiment of the disclosure, the aspherical microlenses have an optical power at the first point comprised between 2.0 D and 7.0 D in absolute value, and an optical power at the second point comprised between 1.5 D and 6.0 D in absolute value.

The asphericity of the aspherical microlenses before the coating of the surface of the lens element on which the optical elements are disposed may vary according to the radial distance from the optical center of said lens element.

Additionally, the asphericity of the aspherical microlenses after the coating of the surface of the lens element on which the optical elements are disposed may further vary according to the radial distance from the geometrical center of said lens element.

According to an embodiment of the disclosure, the at least one multifocal refractive micro-lens has a toric surface. A toric surface is a surface of revolution that can be created by rotating a circle or arc about an axis of revolution (eventually positioned at infinity) that does not pass through its center of curvature.

Toric surface lenses have two different radial profiles at right angles to each other, therefore producing two different focal powers.

Toric and spheric surface components of toric lenses produce an astigmatic light beam, as opposed to a single point focus.

According to an embodiment of the disclosure, the at least one of the optical elements having a non-spherical optical function, for example all, of the optical elements is a toric refractive micro-lens. For example, a toric refractive micro-lens with a sphere power value greater than or equal to 0 diopter ($\delta$) and smaller than or equal to +5 diopters ($\delta$), and cylinder power value greater than or equal to 0.25 Diopter ($\delta$).

As a specific embodiment, the toric refractive microlens may be a pure cylinder, meaning that minimum meridian power is zero, while maximum meridian power is strictly positive, for instance less than 5 Diopters.

The optical elements can be made using different technologies like direct surfacing, molding, casting or injection, embossing, filming, or photolithography etc. . . . .

The disclosure further relates to a method of machining a lens element intended to be worn in front of an eye of a wearer.

Figure 9A:
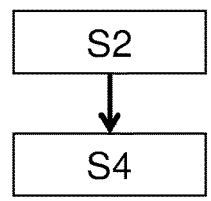
FIGS. 9a and 9b illustrate a method of machining a lens element intended to be worn in front of an eye of a wearer.

As illustrated on FIG. 9a, the method comprises a step S2 of providing an initial lens element. The initial lens element comprises at least one support surface comprising a plurality of at least two optical elements having an optical function of not focusing an image on the retina of the eye of the wearer, for example so as to slow down the progression of the abnormal refraction of the eye.

Advantageously, the plurality of at least two optical elements have at least a first surface that differs from the support surface.

The method further comprises a step S4 during which at least part, for example all, of the plurality of optical elements are machined so as to have over part of the optical elements surfaces a surface parallel to the support surface. Such machining step S4 is illustrated on FIG. 9b where a translation of a surface 18 equivalent to the support surface along the axis of symmetry of said support surface is represented by a dotted surface.

Advantageously, the method according to the disclosure allows improving in terms of efficiency, cost reduction, and resources required, the process to obtain a lens element that reduces the progression of the abnormal refraction of the eye of the wearer while maintaining a good visual acuity for the wearer.

Figure 9B:
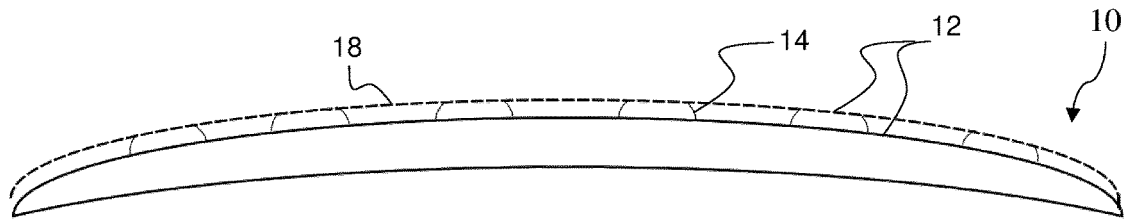

The method according to the disclosure allows adjusting the density of optical elements on the lens element by adjusting the level of the cutting altitude of the dotted line surface represented on FIG. 9b.

The support surface may be the same independently of the prescription of the wearer, the optical function of the lens element being adjusted by the opposite surface, i.e. the one free of optical elements. Such embodiment is advantageous in terms of cost and logistic. Indeed, the lens element provided in step S2 is usually obtain using a mold that is very expensive to manufacture. Having the same support surface for a great range of prescription allows reducing the number of different molds required and therefore reduce costs and logistics. During the machining step, the part of the first surface of the optical elements is removed, for example using surfacing methods, to obtain a second surface that has the same curvature as the support surface.

The disclosure further relates to a mold for a lens element comprising a plurality of optical elements having a targeted optical function.

Figure 10:
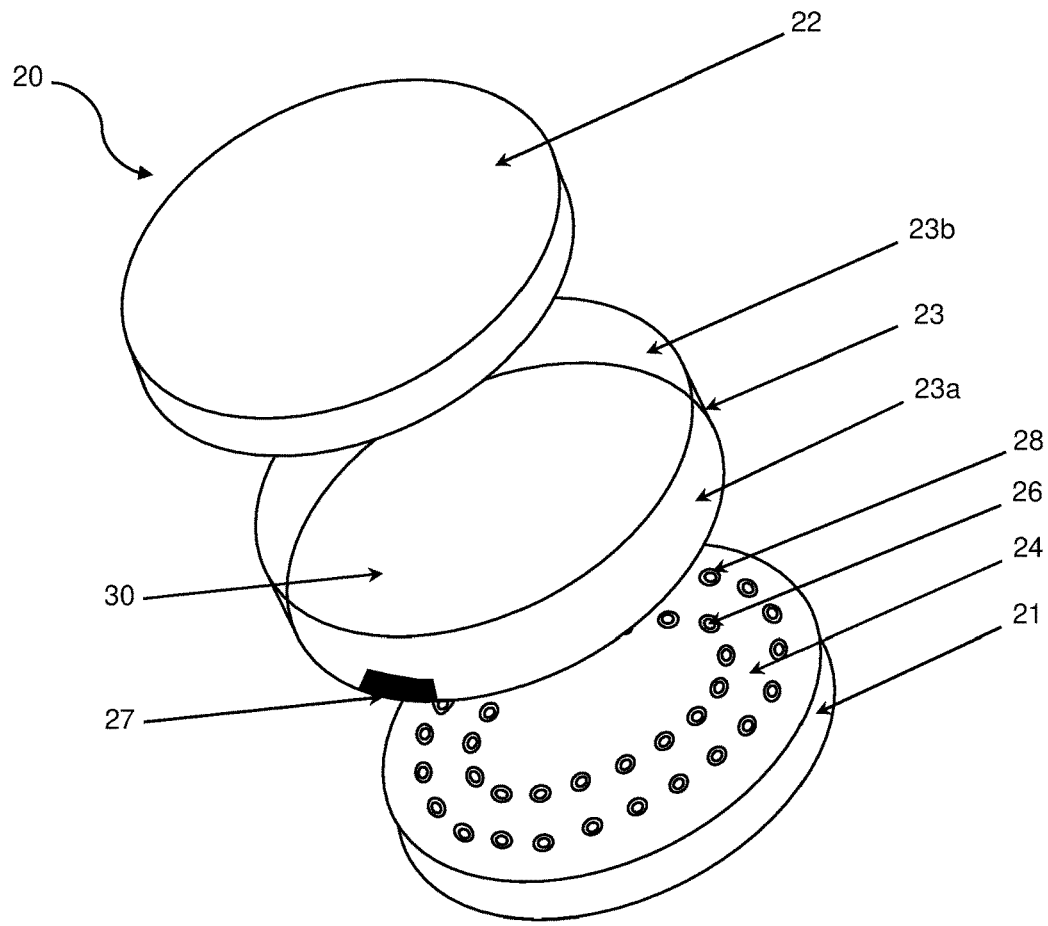
FIG. 10 illustrates an exploded view of a mold for a lens element according to an embodiment of the disclosure.

As represented on FIG. 10, the mold 20 comprises a first molding element 21 having a first molding surface 24. The first molding surface 24 may be a spherical surface having a first curvature.

The first molding surface 24 comprises a plurality of first surfacic elements 26. Each first surfacic elements 26 has a spherical surface having a curvature substantially identical to the first curvature.

Part of, preferably all of the plurality of first surfacic elements 26 present an axis of symmetry (Di).

The plurality of first surfacic elements 26 have a contour shape being inscribable in a circle (C) having a diameter greater than or equal to 0.8 mm and smaller than or equal to 3.0 mm. The circle (C) may be a planar projection of the surface of the surfacic element, for example in a plane orthogonal to the axis of symmetry of the surfacic element.

The axis of symmetry of each first surfacic elements 26 may correspond to the center of circle in which each surfacic element is respectively inscribed.

The first molding surface 24 further comprises a plurality of second surfacic elements 28. Each second surfacic element 28 has a spherical surface having a second curvature that differs from the first curvature, for example the second curvature is greater than the first curvature.

The plurality of second surfacic elements 28 of the first molding element 21 may correspond to the optical elements 14 placed on the surface of the lens element 10.

Although described in detail with a first molding surface 24, first and second surfacic elements being spherical the disclosure is not limited to such embodiments and any of said surfaces, for example all of said surfaces may be aspherical surfaces.

In the sense of the disclosure, aspherical surfacic elements have a continuous evolution of their elevation over their surface.

Along a section of a second surfacic element 28 a section passing through the axis of symmetry (Di) of said second surfacic element, the curvature of the second surfacic element increases from the intersection between the axis of symmetry and the surface of the second surfacic element to a first point, and decrease from said first point to the periphery of second the surfacic element.

At least one, preferably 50%, more preferably more than 80% of the plurality of second surfacic elements 28 may have a toric surface. A toric surface is a surface of revolution that can be created by rotating a circle or arc about an axis of revolution (eventually positioned at infinity) that does not pass through its center of curvature. Toric surface elements have two different radial profiles at right angles to each other. The toric surfacic element may be a pure cylinder, meaning that minimum meridian is zero, while maximum meridian is strictly positive.

According to an embodiment of the disclosure, at least two of the plurality of second surfacic elements 28 are non-contiguous. In the sense of the disclosure, two second surfacic elements are non-contiguous if for all the paths linking the two surfacic elements one may measure at least along part of each path the first curvature of the first surface 24 of the first molding element 21.

According to an embodiment of the disclosure, at least two of the plurality of second surfacic elements 28 are contiguous. In the sense of the disclosure two surfacic elements are contiguous if for at least one path linking the two surfacic elements one may not measure along said at least one path the first curvature of the first surface 24 of the first molding element 21.

At least part, for example all of the plurality of first surfacic elements 26 and/or second surfacic elements 28 may be positioned on a structured mesh.

According to an embodiment of the disclosure, the disposition of at least part, for example all of the plurality of first surfacic elements 26 and/or second surfacic elements 28 on the first surface 24 of the first molding element 21 exhibit symmetry of revolution about an axis, for example centered on the geometrical center of the first surface 24 of the first molding element 21. In other words, at least part of the plurality of first surfacic elements 26 and/or second surfacic elements 28 may be regularly distributed along at least one circle centered on the geometrical center of the first surface 24 of the first molding element 21.

According to an embodiment of the disclosure, at least part, for example all of the plurality of first surfacic elements 26 and/or second surfacic elements 28 are placed on at least a ring on the first surface 24 of the first molding element 21.

The plurality of first surfacic elements 26 and/or second surfacic elements 28 may further be organized on concentric rings on the first surface of the first molding element. For example, the plurality of first surfacic elements 26 and/or second surfacic elements 28 are positioned along a set of 11 concentric rings over the entire first surface 24 of the first molding element 21. The concentric rings of surfacic elements may be centered on the geometrical center of the first surface 24 of the first molding element 21.

The mean curvature of the plurality of second surfacic elements 28 may be identical for all the second surfacic elements of the same concentric ring. In particular, the mean curvatures of the central zone of the second surfacic elements 28 of the same concentric ring are identical.

According to other embodiments of the disclosure, the plurality of first surfacic elements 26 and/or second surfacic elements 28 may be organized on different patterns, such as for example hexagonal shaped pattern, triangle shaped pattern, square shaped pattern, Voronoi pattern.

The plurality of second surfacic elements 28 may be configured so that along at least one section of the first molding element 21, the mean curvature of the plurality of second surfacic elements increases from a point of the section towards the peripheral part of said section.

The plurality of second surfacic elements 28 may be configured so that along at least one section of the first molding element 21 passing through a geometric center of the first surface 24 of said first molding element, the mean curvature of the plurality of second surfacic elements 28 increases from said geometric center towards the peripheral part of said section.

The plurality of second surfacic elements 28 may be configured so that along at least one section of the first molding element 21, for example a section passing through the geometric center of the first surface of the first molding element, the mean curvature of the plurality of second surfacic elements 28 increases from a first point of said section towards the peripheral part of said section and decreases from a second point of said section towards the peripheral part of said section, the second point being closer to the peripheral part of said section than the first point.

For every circular zone having a radius comprised between 4 and 8 mm comprising a geometrical center of the first surface 24 of the first molding element 21 at a distance greater or equal to said radius+5 mm, the ratio between the sum of areas of the plurality of second surfacic elements located inside said circular zone and the area of said circular zone is comprised between 20% and 70%.

Preferably, the first surfacic elements 26 respectively are independent island-shaped elements.

Preferably, the second surfacic elements 28 have an annular shape. More, preferably, each second surfacic elements 28 surrounds a first surfacic element 26.

The mold 20 further comprises a second molding element 22 having a second surface. The second surface 25 of the second molding element 22 is not represented in FIG. 10 as it faces the first surface 24 of the first molding element.

The mold 20 further comprises a gasket 23. The gasket 23 has an annular form comprising an outer surface 23a and an inner surface 23b. The gasket 23 further comprises an opening 27.

The gasket 23 seals the first and second molding elements 21 and 22 together to form a molding cavity 30. The molding cavity 30 is defined by the first surface 24 comprising the first surfacic elements 26 and the second surfacic elements 28 of the first molding element 21, the second surface 25 of the second molding element 22, and the inner surface 23a of the gasket 23.

The molding cavity 30 of the mold 20 for a lens element 10 is filled with a molding material through the opening 27. Despite being represented in the gasket 23, the opening 27 may alternatively be placed on the first molding element or the second molding element. For example, the molding material may be a casting material poured into the molding cavity through the opening 27 of the gasket 23. The casting material in the molding cavity is further polymerized into a lens material thereby forming the lens element 10.

Alternatively, the molding material may be a thermo-plastic material. The thermo-plastic material which is in a first liquid state at a first temperature is injected into the mold cavity 30 through opening 27. During the cooling process, the thermo-plastic material changes from a first liquid state to a second solid state corresponding to the lens material of lens element 10.

Many further modifications and variations will be apparent to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A lens element intended to be worn in front of an eye of a wearer comprising:
   a refraction area having a refractive power based on a prescription for said eye of the wearer; and
   at least two optical elements having an optical function of not focusing an image on a retina of the eye of the wearer,
   wherein the refraction area includes a plurality of respectively independent island-shaped areas, the refraction area is formed as an area other than the at least two optical elements, and each refraction island shape area is within one optical element,
   wherein the optical elements are positioned on a structured mesh being a squared mesh or a hexagonal mesh or a triangle mesh or an octagonal mesh.

2. The lens element according to claim 1, wherein at least part of the optical elements have an annular shape around a refraction area.

3. The lens element according to claim 1, wherein the at least two optical elements are contiguous.

4. The lens element according to claim 1, wherein the optical elements have a contour shape being inscribable in a circle having a diameter greater than or equal to 0.8 mm and smaller than or equal to 3.0 mm.

5. The lens element according to claim 1, wherein at least one of the optical elements has an optical function of focusing an image on a position other than the retina in standard wearing conditions.

6. Lens element according to claim 1, wherein at least one of the optical elements has a non-spherical optical function in standard wearing conditions.

7. The lens element according to claim 1, wherein at least one of the optical elements has a cylindrical power.

8. The lens element according to claim 1, where the optical elements are configured so that along at least one section of the lens element a mean sphere of optical elements varies from a point of said section towards a peripheral part of said section.

9. The lens element according to claim 1, wherein the optical elements are configured so that along at least one section of the lens element a cylinder of optical elements varies from a point of said section towards a peripheral part of said section.

10. The lens element according to claim 1, wherein at least part of the optical elements are located on a front surface of the lens element.

11. The lens element according to claim 1, wherein at least part of the optical elements are located between front and back surfaces of the lens element.

12. The lens element according to claim 1, wherein a sphere of at least part of the optical elements increases within an optical element with eccentricity.

13. A mold for a lens element comprising having a plurality of optical elements having a targeted optical function, comprising:
   a first molding element having a first surface, the first surface having a first curvature and comprising a plurality of first surfacic elements having a curvature substantially identical to the first curvature and a plurality of second surfacic elements having at least a second curvature that differs from the first, the first surfacic elements being respectively independent island-shaped elements;
   a second molding element having a second surface; and
   a gasket having an inner and an outer surface,
   wherein the first surface of the first molding element, the second surface of the second element, and the inner surface of the gasket form a molding cavity in which a molding material is to be filled, and
   wherein the lens element further includes a refraction area having a refractive power based on a prescription for an eye of a wearer, and at least two optical elements of the plurality of optical elements having an optical function of not focusing an image on a retina of the eye of the wearer, wherein the refraction area includes a plurality of respectively independent island-shaped areas, the refraction area is formed as an area other than the at least two optical elements, and each refraction island shape area is within one optical element, wherein the optical elements are positioned on a structured mesh being a squared mesh or a hexagonal mesh or a triangle mesh or an octagonal mesh.

14. The mold according to claim 13, wherein each first surfacic element is within one second surfacic element.

15. A method of machining a lens element intended to be worn in front of an eye of a wearer, comprising:
providing an initial lens element having at least one support surface including at least two optical elements having an optical function of not focusing an image on a retina of the eye of the wearer; and
machining at least part of the at least optical elements to have over part of the optical elements surfaces a surface parallel to the support surface,
wherein the lens element further includes a refraction area having a refractive power based on a prescription for said eye of the wearer, and at least two optical elements having the optical function of not focusing an image on the retina of the eye of the wearer, wherein the refraction area includes a plurality of respectively independent island-shaped areas, the refraction area is formed as an area other than the at least two optical elements, and each refraction island shape area is within one optical element, wherein the optical elements are positioned on a structured mesh being a squared mesh or a hexagonal mesh or a triangle mesh or an octagonal mesh.

* * * * *